(No Model.)
E. C. BENNETT & E. C. FREEZE.
UNIVERSAL JOINT FOR INCANDESCENT LAMP BRACKETS.
No. 447,486. Patented Mar. 3, 1891.
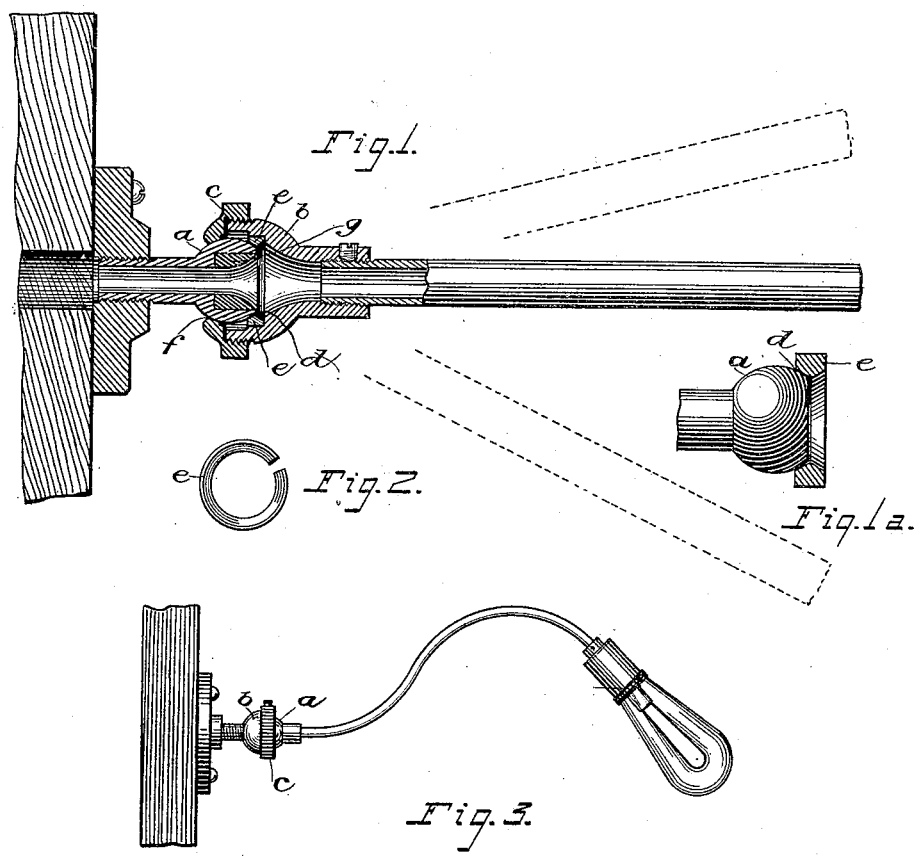
Witnesses.
Charles G. Hawley.
Ella Edler.
Inventors.
E. C. Bennett & E. C. Freeze.
By George A. Barton
Attorney.

UNITED STATES PATENT OFFICE.

EDWIN C. BENNETT AND ELISHA C. FREEZE, OF CHICAGO, ILLINOIS.

UNIVERSAL JOINT FOR INCANDESCENT-LAMP BRACKETS.

SPECIFICATION forming part of Letters Patent No. 447,486, dated March 3, 1891.

Application filed April 4, 1890. Serial No. 346,593. (No model.)

*To all whom it may concern:*

Be it known that we, EDWIN C. BENNETT and ELISHA C. FREEZE, citizens of the United States, residing at Chicago, in the county of Cook and State of Illinois, have invented a certain new and useful Improvement in Universal Joint for Incandescent-Lamp Brackets, (Case 1,) of which the following is a full, clear, concise, and exact description, reference being had to the accompanying drawings, forming a part of this specification.

Our invention is designed more especially for use in connection with brackets for supporting incandescent electric lamps. By its use the bracket may be adjusted to any position desired.

Our invention relates more particularly to the universal joint; and it consists in the following features: first, a ball-and-socket joint provided with an opening for a pair of flexible conducting-wires, the joint being provided with insulating material at the portion thereof which comes against the wires in order that in case the insulating-covering should be abraded or worn away there will be no electrical connection formed with the metallic bracket; second, a ball-and-socket joint for uniting tubes containing electric conductors, the socket being formed of a cup and cap, the cap being adapted to be screwed over the cup to form an adjustable frictional clamp between the ball and socket; third, in connection with the ball-and-socket joint we provide a friction-ring, preferably open on one side, this ring being placed in the cup and serving as the bearing or seat for the ball when in position.

Heretofore in a ball-and-socket joint the ball of one section has been held in the socket of the other by means of an annular cap secured by its flanges to corresponding flanges provided on the socket. The cap which we preferably use is in the form of a nut and adapted to be screwed over the edge of the cap and to be adjusted from time to time to compensate for wear in the joint, or to make the joint more or less flexible, as occasion may require. This annular cap or nut and the frictional ring between the ball and socket for uniting the two sections of a metallic tube containing electric conductors constitute the principal and most important features of our invention. It may be observed, however, that our device would be operative without the metallic ring, and also that the rubber bushing, preferably, placed in the end of the opening of the ball, may be omitted, though by the use of this bushing it is found practicable or prudent to use thinner insulation for the conductors than would be permissible without such bushing.

Our invention will be more readily understood by reference to the accompanying drawings, in which—

Figure 1 is a detail view, partly in section, of our universal joint for incandescent-electric-lamp brackets. Fig. 1$^a$ is a detail view of the ball and ring. Fig. 2 is a detail view of the metallic friction-ring. Fig. 3 is a general view of the bracket carrying an incandescent lamp. Fig. 4 is a detail view, partially in section, of a modification of the joint, the rubber bushing and the friction-ring being omitted.

Like parts are indicated by similar letters of reference throughout the different figures.

As shown in Fig. 1, the ball $a$ is provided upon the fixed section of the tube. The socket consists of the cup $b$ and the cap $c$, which is in the form of a nut and screwed upon the cup, the cup being provided with a screw corresponding to the nut. The nut is adapted to be screwed over the cup to cause the desired amount of friction at the outer edge or portion $d$ of the ball where it bears upon the friction-ring $e$ and at the portion $f$ of the nut where it bears upon the ball. Thus it will be seen the ring $e$ is placed in a seat provided in the bottom of the socket and serves as an elastic frictional bearing between the edge of the ball or the portion of the ball about the opening therein and the socket or the cup of the socket, while the other annular frictional bearing is between the portion of the nut which incloses the ball and the ball.

We preferably provide a rubber bushing $g$ within the opening or bore of the ball, so that wires passing through the same when worn by repeated bending may not, in case their insulation should be impaired, form electrical connection with the metallic portion of the joint.

As shown in Fig. 1, the ball is provided upon the stationary section of the tube or bracket.

As shown in Figs. 3 and 4, the ball is upon the outer or flexible section of the tube, while the socket is provided upon the stationary section—that is, the portion secured to the side of the room.

In Fig. 4 we have shown the flexible conductor passing through the bracket, and we have omitted the friction-ring and the rubber bushing; but, as before stated, we find it preferable to use the bushing as well as the friction-ring, as shown in Fig. 1, since it is evident that the ring when worn may be replaced by a new ring and that being open at one edge it will adjust itself to the seat provided therefor in the bottom of the cup when pressure is brought to bear thereon by the tightening of the nut.

The ring $e$ is preferably symmetrical, as shown, so that it may be placed in the cup with either side toward the ball, and in case of wear on one side it may be reversed. We preferably use a ring of spring metal in order that it may be sufficiently yielding and elastic to permit a certain margin of adjustment of the nut—that is to say, it is necessary that the bracket shall be adjustable—that is, capable of being moved in either direction, and yet the frictional bearing must be sufficient to retain it in the position to which it may be moved and this function of adjustability of position is materially aided by the elasticity of the ring.

It is evident that any yielding elastic material of sufficient hardness might be substituted for metal in the construction of the ring. For example, we might use vulcanite fiber or rubber or leather with good results.

Ordinarily but a single pair of conductors will be included in the tube, these conductors being connected with the different ends of the filament of the incandescent lamp. It is evident, however, that the number of conductors may be varied according to circumstances.

Having thus described our invention, we claim as new and desire to secure by Letters Patent—

The combination, in a ball-and-socket joint provided with an opening for a pair of flexible conducting-wires, of insulating material at the portion thereof which comes against the wires, the socket of said joint being formed of a cup and cap, said cap being adapted to be screwed over the cup to form an adjustable frictional clamp between the ball and socket, and a reversible frictional ring open on one side, placed in the cup, and serving as a bearing or seat for the ball when in position, substantially as and for the purpose specified.

In witness whereof we hereunto subscribe our names this 1st day of April, A. D. 1890.

EDWIN C. BENNETT.
ELISHA C. FREEZE.

Witnesses:
GEORGE P. BARTON,
ELLA EDLER.